(12) United States Patent
Rebot et al.

(10) Patent No.: US 9,921,461 B1
(45) Date of Patent: Mar. 20, 2018

(54) CLIP FOR MOUNTING EXTERNAL DEVICE TO ELECTRONIC DEVICE

(71) Applicant: SPIN MASTER LTD., Toronto (CA)

(72) Inventors: Natalie Rebot, Toronto (CA); Hamid R. Hashemi, Mississauga (CA); Herman Chan, Toronto (CA)

(73) Assignee: SPIN MASTER LTD., Toronto (CA)

( * ) Notice: Subject to any disclaimer, the term of this patent is extended or adjusted under 35 U.S.C. 154(b) by 0 days.

(21) Appl. No.: 15/712,259

(22) Filed: Sep. 22, 2017

(51) Int. Cl.
| | |
|---|---|
| *B60R 11/00* | (2006.01) |
| *G03B 21/14* | (2006.01) |
| *F16B 2/10* | (2006.01) |
| *G02B 7/00* | (2006.01) |
| *G03B 21/02* | (2006.01) |
| *G03B 21/00* | (2006.01) |
| *B60R 11/02* | (2006.01) |

(52) U.S. Cl.
CPC ........ *G03B 21/145* (2013.01); *B60R 11/0235* (2013.01); *B60R 11/0252* (2013.01); *F16B 2/10* (2013.01); *G02B 7/003* (2013.01); *G03B 21/001* (2013.01); *G03B 21/02* (2013.01)

(58) Field of Classification Search
CPC . B60R 11/00; B60R 11/0235; B60R 11/0252; G03B 21/145
See application file for complete search history.

(56) References Cited

U.S. PATENT DOCUMENTS

| | | | |
|---|---|---|---|
| 2,445,651 A | 7/1948 | Weavie | |
| 2,478,336 A | 8/1949 | Stein et al. | |
| 5,321,449 A | 6/1994 | Coccoli et al. | |
| 7,874,683 B2 | 1/2011 | Noba | |
| 8,744,521 B2 | 6/2014 | Kim et al. | |
| 2003/0024975 A1 | 2/2003 | Rajasekharan | |

(Continued)

FOREIGN PATENT DOCUMENTS

| | | |
|---|---|---|
| EP | 0246799 B1 | 5/1991 |
| WO | 2007011123 A1 | 1/2007 |

(Continued)

OTHER PUBLICATIONS

PCT/CA2017/000152, International Search Report, dated Sep. 28, 2017, Canadian Intellectual Property Office.

*Primary Examiner* — William C Dowling
(74) *Attorney, Agent, or Firm* — Millman IP Inc.

(57) ABSTRACT

In an aspect, a device-and-clip system is provided for an electronic device. The system includes an external device that cooperates with at least one electronic device feature on the rear face to perform a selected function. The system includes a clip including a first clip arm having an arm marker thereon and which is engageable with the front face of the electronic device and a second clip arm that is engageable with the rear face of the electronic device. The system further includes an application that is executable to instruct the electronic device to display a screen marker on the display screen in a selected position and in a selected orientation such that positioning and orienting of the first clip arm on the display screen of the smart phone with the arm marker aligned with the position and orientation of the screen marker positions the external device in alignment with the at least one electronic device feature.

11 Claims, 7 Drawing Sheets

(56) References Cited

U.S. PATENT DOCUMENTS

| | | | |
|---|---|---|---|
| 2005/0072691 A1* | 4/2005 | Schlansky | B60R 11/00 |
| | | | 206/232 |
| 2009/0108057 A1 | 4/2009 | Mu et al. | |
| 2009/0237812 A1 | 9/2009 | Tseng et al. | |
| 2011/0320208 A1 | 12/2011 | Wong | |
| 2012/0017236 A1 | 1/2012 | Stafford et al. | |
| 2012/0245422 A1* | 9/2012 | Hasbun | A61B 1/00108 |
| | | | 600/200 |
| 2013/0267283 A1 | 10/2013 | Guzman | |
| 2013/0276012 A1 | 10/2013 | Ingram | |
| 2013/0331148 A1* | 12/2013 | Brough | G06F 1/1632 |
| | | | 455/557 |
| 2014/0281855 A1 | 9/2014 | Bhatnagar | |
| 2015/0077518 A1 | 3/2015 | Heine et al. | |
| 2015/0172431 A1 | 6/2015 | Huang | |
| 2015/0323160 A1 | 11/2015 | Duguid | |
| 2016/0360871 A1* | 12/2016 | Schessel | A45F 5/00 |
| 2017/0064168 A1* | 3/2017 | Roman | H04N 5/2251 |
| 2017/0119250 A1* | 5/2017 | Kolachalama | A61B 3/1208 |
| 2017/0237843 A1* | 8/2017 | Ackeret | H04M 1/04 |
| | | | 455/575.9 |
| 2017/0345536 A1* | 11/2017 | Breiwa | H01F 38/14 |

FOREIGN PATENT DOCUMENTS

| | | |
|---|---|---|
| WO | 2014/091042 A1 | 6/2014 |
| WO | 2015092785 A1 | 6/2015 |

\* cited by examiner

CLIP FOR MOUNTING EXTERNAL DEVICE TO ELECTRONIC DEVICE

FIELD

The specification relates generally to clips for mounting external devices, such as projectors, to electronic devices, such as smartphones and tablets, and more particularly to a clip that can mount an external device to different models of electronic device, such as a clip that can mount a projector to an Apple iPhone 6, an Apple iPhone SE, an Apple iPad Pro 12.9", a Samsung Galaxy S8, and a Samsung Galaxy Tab S3.

BACKGROUND OF THE DISCLOSURE

It is known to provide mounting systems for mounting devices to smartphones such as camera lens systems which cooperate with the smartphone camera to provide enhanced capability such as the ability to zoom in by more than is possible on the smartphone itself. However, it can be difficult to ensure that the device, when mounted, is in suitable alignment with the feature of the smartphone that it is intended to cooperate with.

SUMMARY OF THE DISCLOSURE

In an aspect, a device-and-clip system is provided for an electronic device such as a smartphone or a tablet having a front face with a display screen thereon, and a rear face opposite to the front face. The device-and-clip system includes an external device that is separate from the electronic device but which cooperates with at least one electronic device feature on the rear face to perform a selected function. The device-and-clip system further includes a clip including a first clip arm having an arm marker thereon and which is engageable with the front face and a second clip arm that is engageable with the rear face. The first and second clip arms are connected to one another and are movable between an open position to permit removal of the clip from the electronic device and a closed position in which the first and second clip arms clamp the electronic device. The external device is mounted to the clip. The device-and-clip system further includes an application that is executable by the electronic device so as to instruct the electronic device to display a screen marker on the display screen in a selected position and in a selected orientation such that positioning and orienting of the first clip arm on the display screen with the arm marker aligned with the position and orientation of the screen marker positions the external device in alignment with the at least one electronic device feature.

In another aspect, a device-and-clip assembly is provided for an electronic device such as a smartphone or a tablet having a front face with a display screen thereon, and a rear face opposite to the front face. The device-and-clip assembly includes an external device that is separate from the electronic device but which cooperates with at least one electronic device feature on the rear face to perform a selected function. The device-and-clip system further includes a clip including a first clip arm which is engageable with the front face, a second clip arm that is engageable with the rear face, wherein the first and second clip arms are connected to one another and are movable between an open position to permit removal of the clip from the electronic device and a closed position in which the first and second clip arms clamp the electronic device and a releasable connection between the clip and the external device. The releasable connection includes a toothed locking arm integrated into one of the second clip arm and the external device, wherein the toothed locking arm is resiliently flexible and includes a locking tooth thereon, and a shoulder on the other of the second clip arm and the external device. The toothed locking arm flexes when slid past the shoulder in a first direction and is urged to a locking position wherein the locking tooth overlaps the shoulder to lock the external device to the second clip arm. The toothed locking arm is movable away from the locking position so as to be slid past the shoulder in a second direction for separation of the second clip arm from the external device.

In yet another aspect, a device-and-clip system is provided for an electronic device such as a smartphone or a tablet having a front face with a display screen thereon, and a rear face opposite to the front face. The device-and-clip system includes an external device that is separate from the electronic device but which cooperates with at least one electronic device feature on the rear face to perform a selected function. The device-and-clip system further includes a clip including a first clip arm having an arm marker thereon and which is engageable with the front face and a second clip arm that is engageable with the rear face. The first and second clip arms are connected to one another and are movable between an open position to permit removal of the clip from the electronic device and a closed position in which the first and second clip arms clamp the electronic device. The external device is mounted to the clip. The device-and-clip system further includes an application that is executable by the electronic device so as to instruct the electronic device to display a screen marker on the display screen in a selected position such that positioning of the first clip arm on the display screen with the arm marker aligned with the position of the screen marker positions the external device in alignment with the at least one electronic device feature.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

Figure 1:
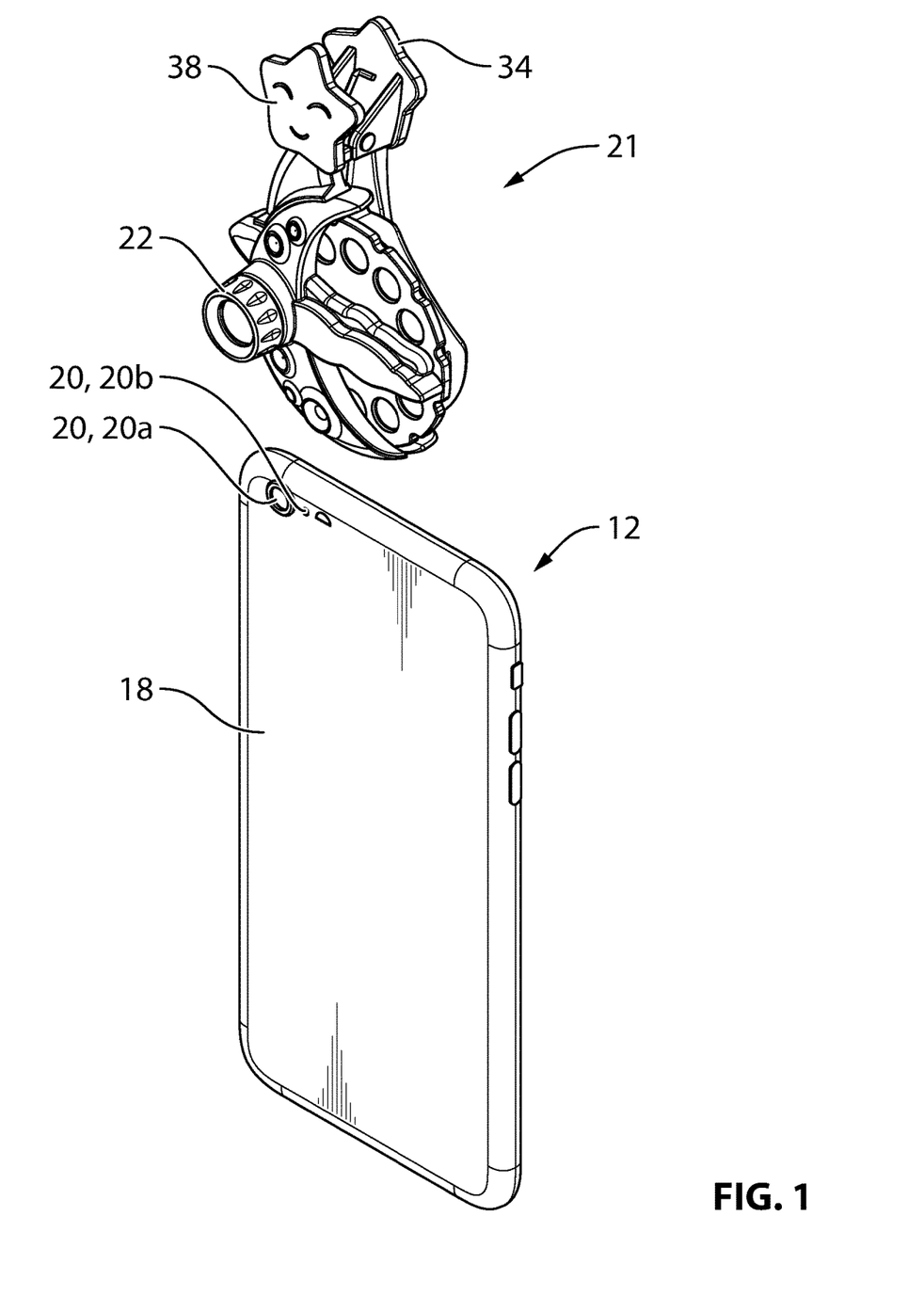
FIG. 1 is a perspective view of a device-and-clip assembly that is mountable to an electronic device such as a smartphone according to a non-limiting embodiment.
Figure 2:
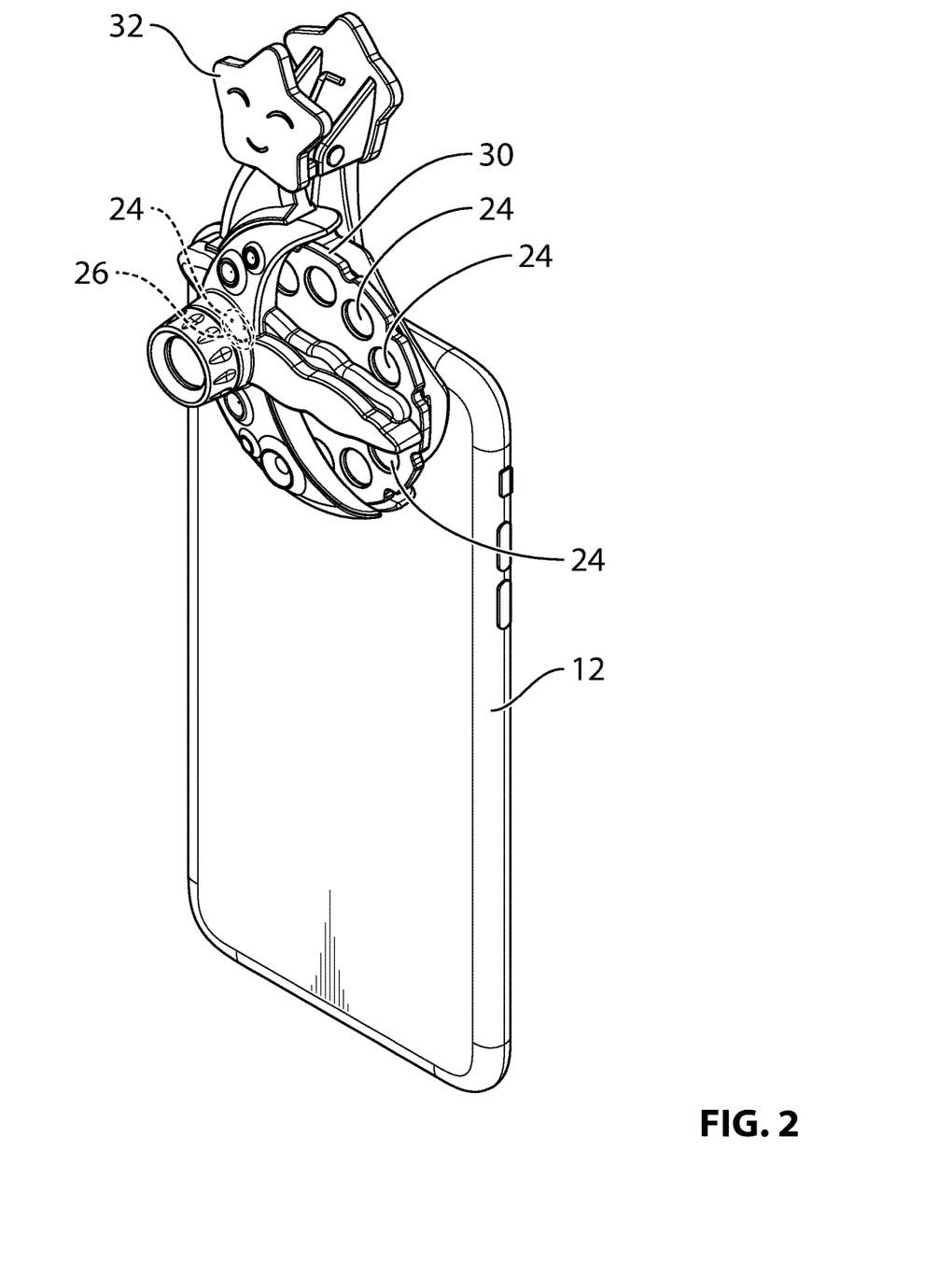
FIGS. 2 and 3 are perspective views of the device-and-clip assembly shown in FIG. 1 mounted to the electronic device.
Figure 3:
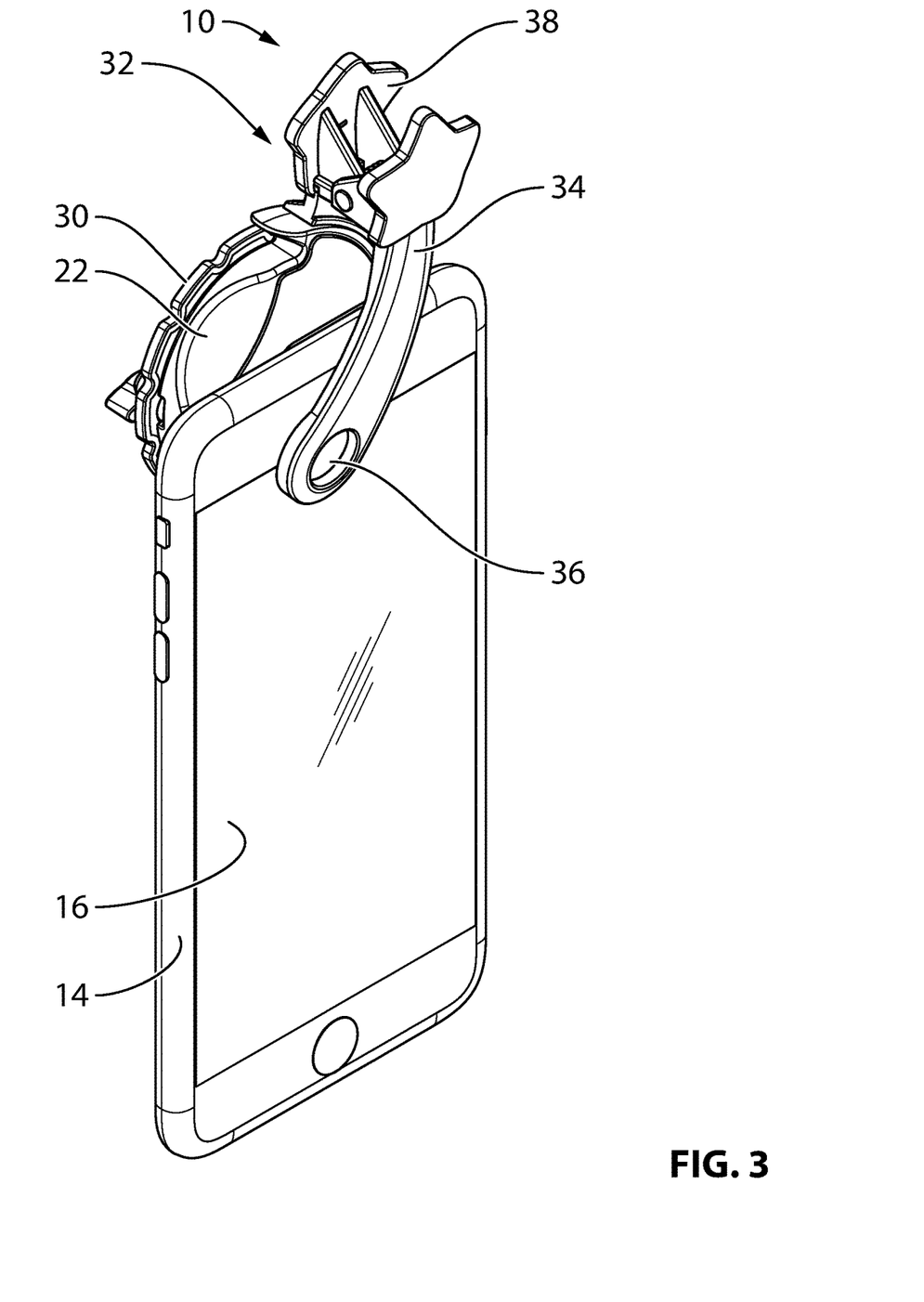

Reference is made to FIGS. 1, 2 and 3, which show a device-and-clip system for an electronic device 12 such as a smartphone or a tablet. The device-and-clip system is configured to permit a user to properly position and use an external device with the electronic device 12.

The electronic device 12 has a front face 14 (FIG. 3) with a display screen 16 thereon, and a rear face 18 (FIGS. 1 and 2) opposite to the front face 14. The rear face 18 has at least one electronic device feature 20 thereon. In the present example, the rear face 18 has a plurality of features 20, including a camera 20a, and a light-emitting element 20b, which may be, for example, an LED.

The device-and-clip system includes a device-and-clip assembly 21 (FIG. 1) that is mountable to the electronic device 12 and an application 42 (shown schematically at 42 in FIG. 5) that is executable on the electronic device 12.

Figure 4:
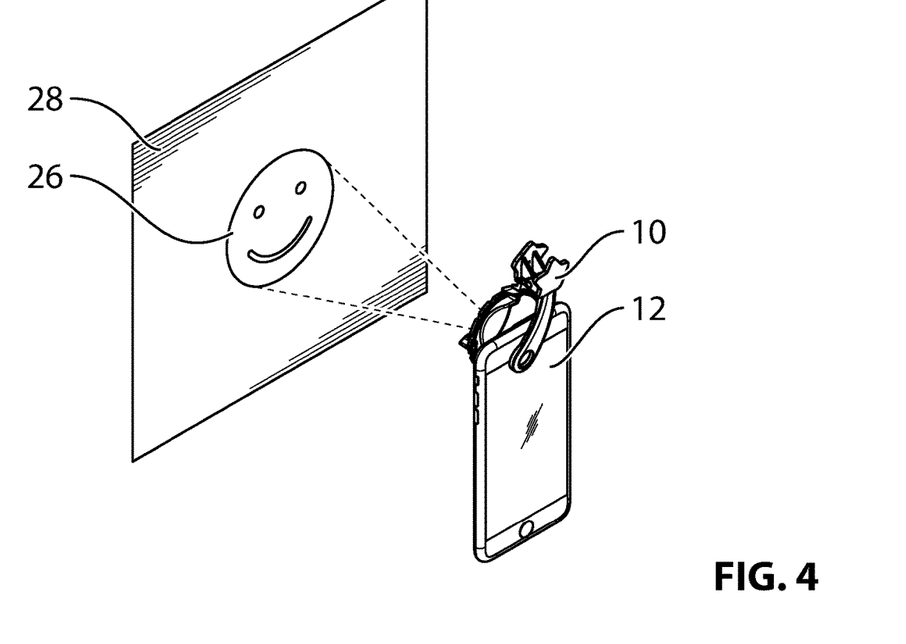
FIG. 4 is a perspective view of the device-and-clip assembly being used to project an image on a receiving surface.

The device-and-clip assembly 21 includes an external device 22 that is separate from the electronic device but which cooperates with at least one electronic device feature 20 (FIG. 1) on the rear face 18 to perform a selected function. The at least one electronic device feature 20 may be selected from the group of features consisting of the camera 20a, the light-emitting element 20b, a laser, a fingerprint sensor, or any other suitable feature. In the present example, the external device 22 is a projector that is positioned to receive light from the light-emitting element 20b, to pass the light through a transparent slide 24 (FIG. 2) containing an image 26, and to project the image 26 onto a suitable receiving surface 28 (FIG. 4), such as a wall, a ceiling, a floor or any other suitable receiving surface. Thus, the aforementioned selected function is to project the image 26 onto the receiving surface 28. In the example shown, the slide 24 is one of a plurality of slides 24 that are held on a slide disk 30. The slide disk 30 is rotatable in the projector so that each slide may in turn be positioned to receive light from the light-emitting element 20b.

It will be understood that the projector is but an example of the external device. The external device 22 could alternatively be some other type of a device, such as, for example, a special lens holder that cooperates with the camera 20a to permit very high magnification photographs to be taken. The external device 22 could itself incorporate electronics and could, therefore, be an electronic device. However, for the purposes of identification it is referred to consistently in the present disclosure as the external device 22, and the device to which it is mounted via the clip 32 is referred to as the electronic device 12.

Figure 8:
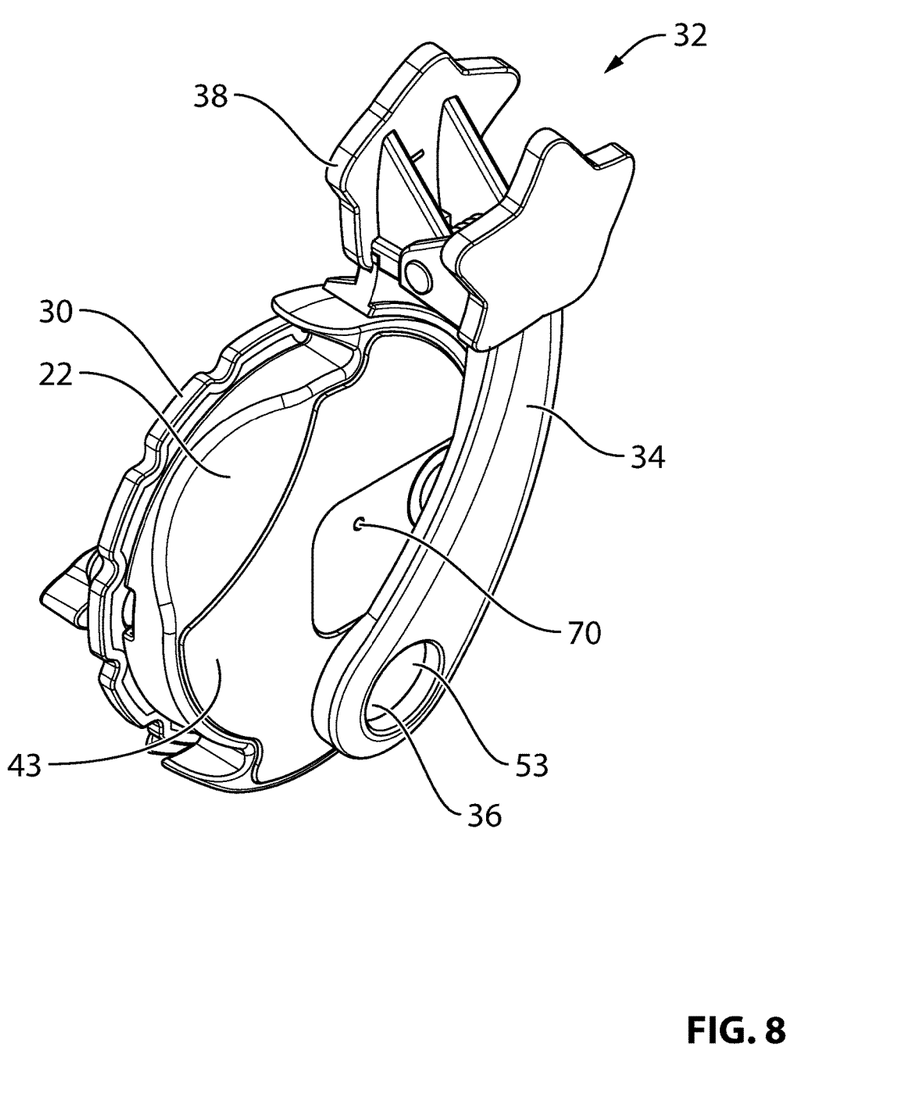
FIG. 8 is a perspective view of the device-and-clip assembly.
Figure 9:
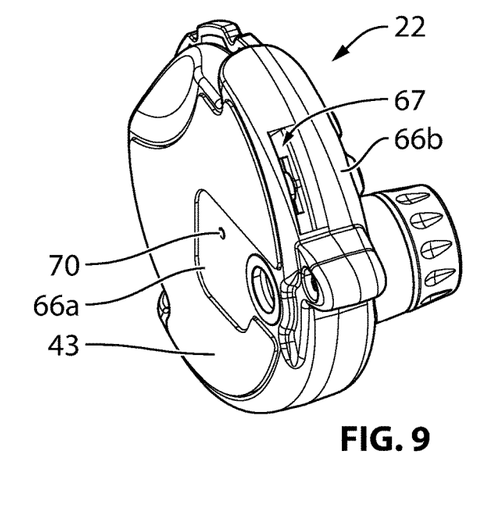
FIG. 9 is a perspective exploded view of device-and-clip assembly.

Referring to FIGS. 8 and 9, the device-and-clip assembly 21 further includes a clip 32 including a first clip arm 34 having an arm marker 36 thereon, and which is engageable with the front face 14 of the electronic device 12 as explained in further detail below. The clip 32 further includes a second clip arm 38 that is engageable with the rear face 18 of the electronic device 12. The first and second clip arms 34 and 38 are connected to one another and are movable between an open position to permit removal of the clip 32 from the electronic device 12 and a closed position in which the first and second clip arms 34 and 38 clamp the electronic device 12. The first and second clip arms 34 and 38 are biased towards the closed position by any suitable means, such as by a clip biasing member 40. In the present example, the clip biasing member 40 is a helical torsion spring, however, any other suitable type of structure may be used as the clip biasing member 40.

Optionally, one or both of the first and second clip arms 34 and 38 may be provided with a gripping layer 43 such as a nano-suction material, a rubber layer, or any other suitable layer to assist in retaining the device-and-clip assembly 21 in place once it is mounted to the electronic device 12. In the present example, both the first and second clip arms 34 and 38 include a gripping layer 43 thereon.

The external device 22 may be mounted to the clip 32 in any suitable way. An example structure that is used to mount the external device 22 to the clip 32 is described further below.

Figure 5:
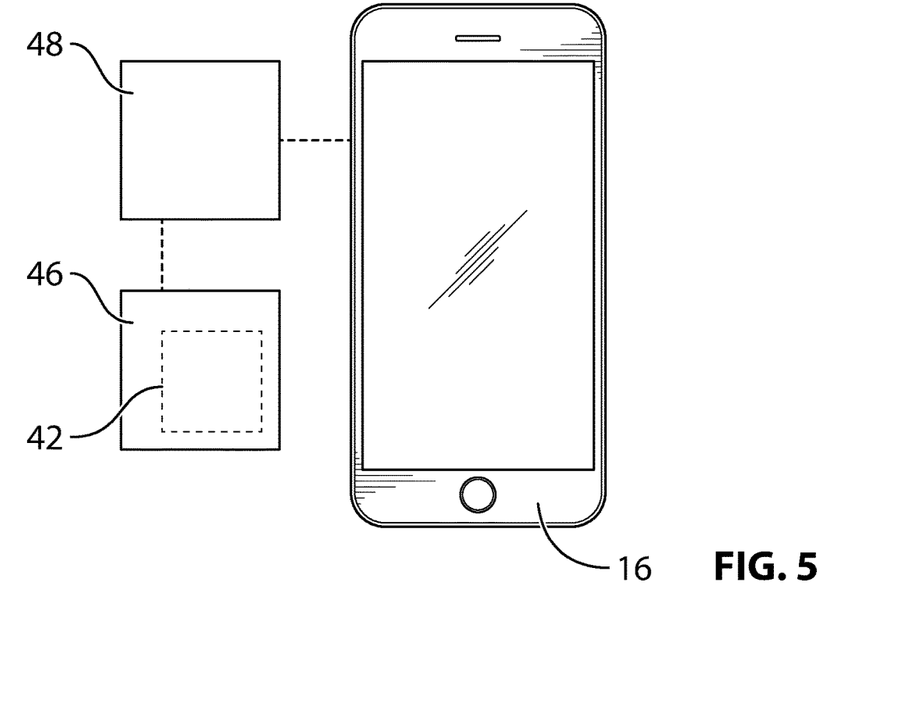
FIG. 5 is a schematic view of an application that is executable by the electronic device that cooperates with a structure on the device-and-clip assembly to assist in positioning and aligning the device-and-clip assembly on the electronic device.
Figure 6A:
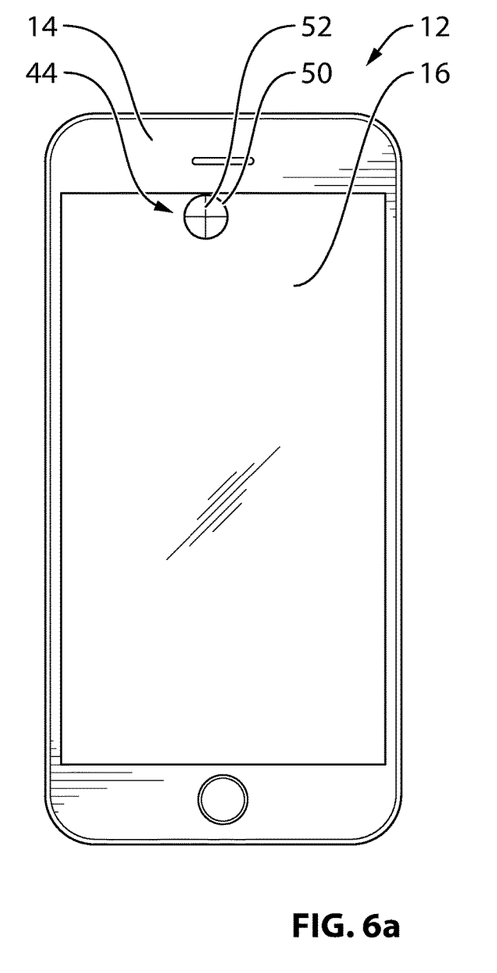
FIG. 6A is a plan view of the electronic device during execution of the application.

FIG. 5 is a schematic layout of some of the hardware that makes up the electronic device 12. Referring to FIGS. 5 and 6A, the application 42 (FIG. 5) is executable by the electronic device 12 so as to instruct the electronic device 12 to display a screen marker 44 (FIG. 6A) on the display screen 16 in a selected position and a selected orientation such that positioning and orienting of the first clip arm 34 on the display screen 16 with the arm marker 36 aligned with the position and orientation of the screen marker 44 positions the external device 22 in alignment with the at least one electronic device feature (in this case 20b).

The screen marker 44 therefore has a shape that has a distinguishable orientation. In the example shown, the screen marker 44 is a circle 50 (albeit with a clipped section at the top) that is positioned at the upper edge of the display screen 16, and which has a cross hair 52 inside it. In the example shown, the circle 50 is displayed in a first colour (e.g. white), and the cross hair 52 is displayed in a second colour that is different than the first colour (e.g. black). Alternatively, any other suitable shape may be used for the screen marker 44 instead of the aforementioned circle 50 and cross hair 52.

With reference to FIG. 5, the application 42 may be stored in a memory 46 in the electronic device 12 and is executed by a processor 48 in the electronic device 12.

Figure 6B:
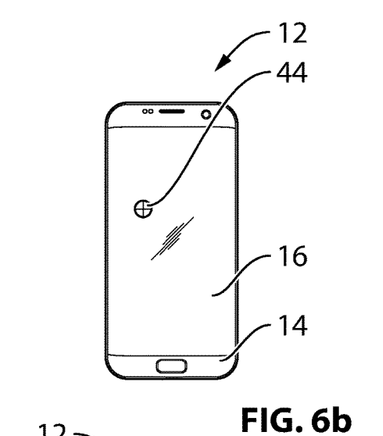
FIGS. 6B and 6C are plan views of other examples of the electronic device during execution of the application.
Figure 6C:
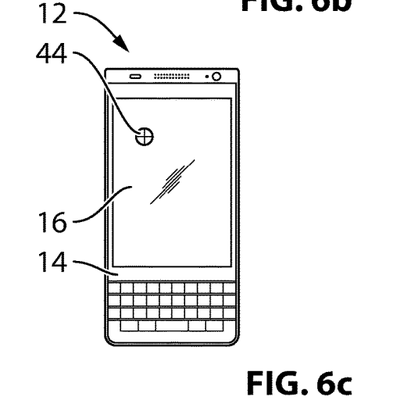

It will be noted that different smartphones have their features 20 in different locations. For example, the light-emitting element 20b on an iPhone SE is about 0.25 inches down and about 0.69 inches over laterally from the upper right corner of the electronic device. However, on an iPhone 6 Plus, the light-emitting element 20b is about 0.25 inches down and about 1 inch over laterally from the upper right corner of the electronic device. The application 42 may be configured to determine the particular model of smartphone 12 that it is running on. It may then be configured to display the screen marker 44 in the appropriate place based on the determined model of smartphone 12. Examples of other screen markers 44 shown in other positions on other types of an electronic device 12 are shown in FIGS. 6B and 6C. In these other examples of an electronic device 12 it will be noted that the circle 50 is not clipped since it is not at an edge of the display screen 16.

The arm marker 36 (shown more clearly in FIGS. 3 and 8) on the first arm 34 may have a similar shape to the screen marker 44 shown in FIG. 6A (e.g. a circle with a cross hair therein) such that alignment of the arm marker 36 with the position and orientation of the screen marker 44 means superposition of the arm marker 36 on the screen marker 44.

Figure 7:
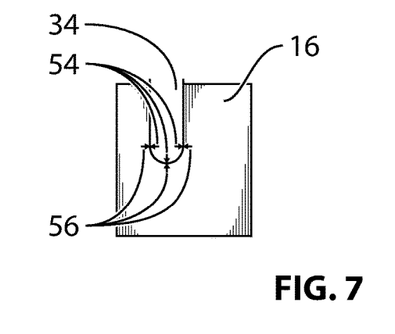
FIG. 7 is a plan view of an alternative structure on the device-and-clip assembly and an alternative application that cooperate to assist in positioning and aligning the device-and-clip assembly on the electronic device.

For this purpose, the arm marker 36 may be provided in a transparent portion 53 of the first clip arm 34. In other embodiments, however, the screen marker 44 may be some other shape and the arm marker 36 need not be provided in a transparent portion of the first clip arm 36 in order to be aligned with the position and orientation of the screen marker 44. For example, the arm marker 36 may include three arrowheads 54 as shown in FIG. 7, which are positioned at three points along the edge of first clip arm 34, and the screen marker 44 may include three other arrowheads 56 that would just abut the three arrowheads 54 on the arm marker 36 when the arm marker 36 is aligned with the position and orientation of the screen marker 44. In such an embodiment, the first clip arm 34 need not include a transparent portion.

Reference is made to FIGS. 9, 10A, 10B and 10C. The mounting of the external device 22 to the second arm 38 is now described in more detail. It is optional that a releasable connection shown generally at 58 (FIGS. 10A and 10B) be provided between the clip 32 and the external device 22. This permits the user to change out the clip 32 for a different one that has preferred features. For example, a slide disk 30 may come in a package with a new clip that has a certain ornamentation theme on it that matches the story illustrates in the slides 24 on the disk 30. The user may switch out the standard clip 32 that came with their device 22 for the new clip to provide increased enjoyment during viewing of the slides 24 on the disk 30. In other embodiments, another clip may be provided for other reasons. For example, while the clip 32 may work generally with a range of different smartphones, the user may purchase a certain clip that is specifically tailored to fit the specific smartphone 12 that the user owns with reduced obstruction of the display screen 16.

The releasable connection 58 may include a toothed locking arm 60 integrated into one of the second clip arm 38 and the external device 22 and a shoulder 62 on the other of the second clip arm 38 and the external device 22. The toothed locking arm 60 is resiliently flexible and includes a locking tooth 64 thereon. The toothed locking arm 60 flexes (FIG. 10A) when slid past the shoulder 62 in a first direction (e.g. downwards in the view shown in FIG. 10A) and is urged by its resiliency to a locking position (FIG. 10B) wherein the locking tooth 64 overlaps the shoulder 62 to lock the external device 22 to the second clip arm 38.

In the embodiment shown, the toothed locking arm 60 is provided on the second clip arm 38 and the shoulder 62 is provided on the external device 22. More specifically, the shoulder 62 is provided on a first housing portion 66a of the external device 22. The housing of the external device 22 may further include a second housing portion 66b and a third housing portion 66c. A slot 67 (FIG. 9) may be provided in the housing (e.g. between housing portions 66a and 66b), so that the shoulder 62 and the toothed locking arm 60 are hidden when the external device 22 is mounted to the second clip arm 38.

The locking tooth 64 shown is provided with a chamfered leading edge 65 in order to facilitate the passing of the locking tooth 64 past the projection on the housing portion 66a that has the shoulder 62 on it. Additionally or alternatively, the projection that has the shoulder 62 on it may be provided with a chamfered edge.

Figure 10A:
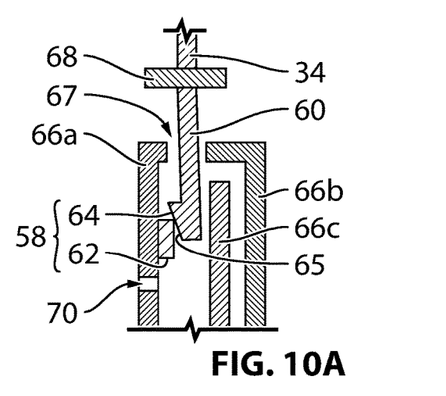
FIGS. 10A, 10B and 10C are sectional views of the device-and-clip assembly during connection of an external device from the device-and-clip assembly to a cip arm from the device-and-clip assembly.
Figure 10B:
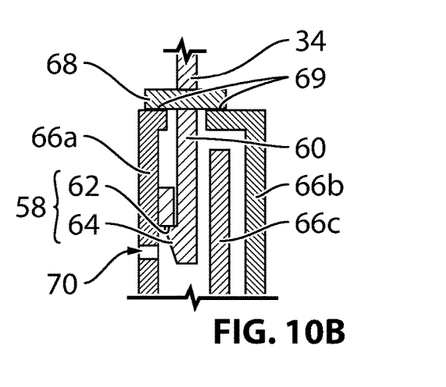
Figure 10C:
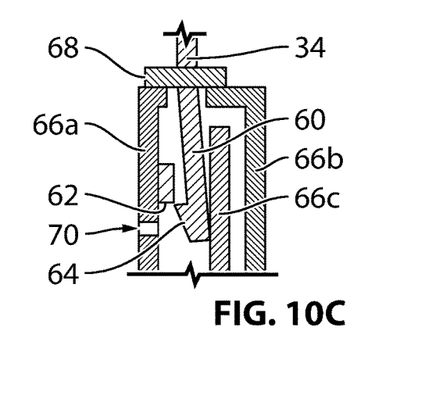

When the toothed locking arm 60 is in the locking position shown in FIG. 10B, a flange 68 on the toothed locking arm 60 may engage an engagement surface 69 of the housing of the external device 22 to cooperate with the engagement of the locking tooth 64 and the shoulder 62 to help retain the external device 22 on the second clip arm 38.

The toothed locking arm 60 is movable away from the locking position (FIG. 10C) so as to be slid past the shoulder in a second direction (e.g. upwards in the view shown in FIG. 10A) for separation of the second clip arm 38 from the external device 22. In the embodiment shown, a release aperture 70 is provided in the housing portion 66a that permits a user to insert a paperclip end or the like to push the toothed locking arm 60 away from the locking position.

In some embodiments the it is possible that the application 42 is executable by the electronic device 12 so as to instruct the electronic device 12 to display a screen marker on the display screen 16 in a selected position such that positioning of the first clip arm 34 on the display screen 16 with the arm marker 36 aligned with the position of the screen marker positions the external device 22 in alignment with the at least one electronic device feature. In other words, in some embodiments, it is not necessary for the screen marker to have a distinguishable alignment in order to ensure that the external device 22 is suitably aligned with the at least one electronic device feature 20. In such embodiments, the at least one electronic device feature is a single feature and the screen marker and the single feature 20 are aligned with one another. Additionally, the arm marker 36 on the first clip arm 34 and the element of the external device 22 that would be aligned with the electronic device feature 20 would be aligned. As a result, when the device-and-clip assembly 21 is placed with the arm marker 36 aligned with the screen marker, the element on the external device 22 is automatically already in alignment with the electronic device feature 20.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device-and-clip system for an electronic device having a front face with a display screen thereon, and a rear face opposite to the front face, the device-and-clip system comprising:
   an external device that is separate from the electronic device but which cooperates with at least one electronic device feature on the rear face to perform a selected function;
   a clip including
      a first clip arm having an arm marker thereon and which is engageable with the front face;
      a second clip arm that is engageable with the rear face, wherein the first and second clip arms are connected to one another and are movable between an open position to permit removal of the clip from the electronic device and a closed position in which the first and second clip arms clamp the electronic device, wherein the external device is mounted to the clip; and
   an application that is executable by the electronic device so as to instruct the electronic device to display a screen marker on the display screen in a selected position and in a selected orientation such that positioning and orienting of the first clip arm on the display screen with the arm marker aligned with the position and orientation of the screen marker positions the external device in alignment with the at least one electronic device feature.

2. A device-and-clip system as claimed in claim 1, wherein the at least one electronic device feature includes a light-emitting element.

3. A device-and-clip system as claimed in claim 2, wherein the external device is a projector that is positionable to receive light from the light-emitting element, to pass the light through a transparent slide containing an image, and to project the image onto a suitable receiving surface.

4. A device-and-clip system as claimed in claim 1, wherein the first clip arm includes a transparent portion and the arm marker is positioned in the transparent portion.

5. A device-and-clip system as claimed in claim 4, wherein the screen marker includes a first shape presented in a first colour, and a cross-hair presented in the first shape in a second colour that is different than the first colour.

6. A device-and-clip assembly that is mountable to an electronic device having a front face with a display screen thereon, and a rear face opposite to the front face, the device-and-clip assembly comprising:
   an external device that is separate from the electronic device but which cooperates with at least one electronic device feature on the rear face to perform a selected function; and
   a clip including
      a first clip arm which is engageable with the front face;
      a second clip arm that is engageable with the rear face, wherein the first and second clip arms are connected to one another and are movable between an open position to permit removal of the clip from the electronic device and a closed position in which the first and second clip arms clamp the electronic device; and
   a releasable connection between the clip and the external device, wherein the releasable connection includes
      a toothed locking arm integrated into one of the second clip arm and the external device, wherein the toothed locking arm is resiliently flexible and includes a locking tooth thereon, and
      a shoulder on the other of the second clip arm and the external device,
      wherein the toothed locking arm flexes when slid past the shoulder in a first direction and is urged to a locking position wherein the locking tooth overlaps the shoulder to lock the external device to the second clip arm, and
      wherein the toothed locking arm is movable away from the locking position so as to be slid past the shoulder in a second direction for separation of the second clip arm from the external device.

7. A device-and-clip assembly as claimed in claim 6, wherein the toothed locking arm is integrated into the second clip arm and the shoulder is on the external device.

8. A device-and-clip assembly as claimed in claim 6, wherein the shoulder is provided in a slot in the other of the second clip arm and the external device.

9. A device-and-clip assembly as claimed in claim 6, wherein the at least one electronic device feature includes a light-emitting element.

10. A device-and-clip assembly as claimed in claim 9, wherein the external device is a projector that is positionable to receive light from the light-emitting element, to pass the light through a transparent slide containing an image, and to project the image onto a suitable receiving surface.

11. A device-and-clip system for an electronic device having a front face with a display screen thereon, and a rear face opposite to the front face, the device-and-clip system comprising:
   an external device that is separate from the electronic device but which cooperates with at least one electronic device feature on the rear face to perform a selected function;
   a clip including
      a first clip arm having an arm marker thereon and which is engageable with the front face;
      a second clip arm that is engageable with the rear face, wherein the first and second clip arms are connected to one another and are movable between an open position to permit removal of the clip from the electronic device and a closed position in which the first and second clip arms clamp the electronic device, wherein the external device is mounted to the clip; and
   an application that is executable by the electronic device so as to instruct the electronic device to display a screen marker on the display screen in a selected position such that positioning of the first clip arm on the display screen with the arm marker aligned with the position of the screen marker positions the external device in alignment with the at least one electronic device feature.

* * * * *